US010666568B2

(12) United States Patent
Danielsson (10) Patent No.: US 10,666,568 B2
(45) Date of Patent: May 26, 2020

(54) TIMING TRANSPORT METHOD IN A COMMUNICATION NETWORK (71) Applicant: NET INSIGHT INTELLECTUAL PROPERTY AB, Stockholm (SE)

(72) Inventor: Magnus Danielsson, Stocksund (SE)

(73) Assignee: Net Insight Intellectual Property AB, Stockholm (SE)

(*) Notice: Subject to any disclaimer, the term of this patent is extended or adjusted under 35 U.S.C. 154(b) by 56 days.

(21) Appl. No.: 14/965,324

(22) Filed: Dec. 10, 2015

(65) Prior Publication Data
US 2016/0173395 A1 Jun. 16, 2016

(30) Foreign Application Priority Data
Dec. 12, 2014 (SE) ...................... 1451535

(51) Int. Cl.
*H04L 12/841* (2013.01)
*H04L 12/875* (2013.01)
(Continued)

(52) U.S. Cl.
CPC .............. *H04L 47/28* (2013.01); *H04L 45/40* (2013.01); *H04L 47/245* (2013.01);
(Continued)

(58) Field of Classification Search
CPC ..... H04L 47/28; H04L 47/6205; H04L 47/56; H04L 47/6215
See application file for complete search history.

(56) References Cited

U.S. PATENT DOCUMENTS

| 5,497,371 A | 3/1996 | Ellis et al. |
| 7,701,949 B1 | 4/2010 | Rose et al. |

(Continued)

FOREIGN PATENT DOCUMENTS

| EP | 1239638 A2 | 9/2002 |
| EP | 2538618 A1 | 12/2012 |

OTHER PUBLICATIONS

Swedish Office Action dated Jun. 29, 2015 issued in corresponding Swedish Application No. 1451535-7.
(Continued)

*Primary Examiner* — Charles C Jiang
*Assistant Examiner* — Voster Preval
(74) *Attorney, Agent, or Firm* — Harness, Dickey & Pierce, P.L.C.

(57) ABSTRACT

There is provided a method in a packet based network system for node-to-node transmission of data packets comprising timing packets and non-timing packets, which is directed to a mechanism for providing a delay variation compensation in a timing system or timing sensitive signal transport in a packet based network without participating in the timing signaling of the timing packets or timing sensitive packets themselves. The method comprises associating the data packets with different levels of transmission priority $P_r$, $P_l$, assigning highest (or highest available) transmission priority $P_r$ to the timing packets, separately queuing the timing packets in different buffers 401, 402, and providing first opportunity transmission of the timing packets regardless of transmission priority level of non-timing packets waiting to be transmitted. The advantage of the method is that timing-sensitive traffic thereby experiences reduced buffer delay variations.

17 Claims, 4 Drawing Sheets

(51) Int. Cl.
*H04L 12/863* (2013.01)
*H04L 12/851* (2013.01)
*H04L 12/721* (2013.01)
*H04L 12/853* (2013.01)
*H04L 12/947* (2013.01)

(52) U.S. Cl.
CPC ...... *H04L 47/2416* (2013.01); *H04L 47/2433* (2013.01); *H04L 47/56* (2013.01); *H04L 47/6205* (2013.01); *H04L 47/6215* (2013.01); *H04L 49/251* (2013.01)

(56) References Cited

U.S. PATENT DOCUMENTS

| | | | | |
|---|---|---|---|---|
| 2003/0120795 | A1* | 6/2003 | Reinshmidt | H04L 47/20 709/232 |
| 2006/0011359 | A1* | 1/2006 | Fowble, III | A01B 51/04 172/677 |
| 2006/0268692 | A1* | 11/2006 | Wright | H04L 47/10 370/229 |
| 2007/0011359 | A1* | 1/2007 | Chen | H04L 47/2433 709/251 |
| 2008/0019395 | A1* | 1/2008 | Aithal | H04L 1/0002 370/468 |
| 2009/0323728 | A1* | 12/2009 | Koutsoures | G06F 5/12 370/503 |
| 2010/0149976 | A1 | 6/2010 | Lee | |
| 2010/0202286 | A1* | 8/2010 | Miller | H04L 47/10 370/230 |
| 2011/0270976 | A1* | 11/2011 | Yasuda | H04L 47/10 709/224 |
| 2014/0105218 | A1* | 4/2014 | Anand | H04L 47/6255 370/412 |
| 2015/0365337 | A1* | 12/2015 | Pannell | H04J 3/0697 370/503 |
| 2016/0013876 | A1* | 1/2016 | Zhang | H04J 3/0667 370/350 |

OTHER PUBLICATIONS

Kopetz et al., "The Time-Triggered Ethernet (TTE) Design", Proceedings of the Eighth IEEE International Symposium on Object-Oriented Real-Time Distributed Computing (ISORC'05).

European Office Action dated Jan. 16, 2019 for corresponding European Application No. 15197763.4.

\* cited by examiner

TIMING TRANSPORT METHOD IN A COMMUNICATION NETWORK

CROSS-REFERENCE TO RELATED APPLICATIONS

This application claims priority under 35 U.S.C. § 119 to Swedish Patent Application No. 1451535-7 filed on Dec. 12, 2014, in the Swedish Patent Office (SPRO), the entire contents of which are incorporated herein by reference.

TECHNICAL FIELD

The present invention relates to the field of communication network systems for node-to-node transmission of data, and more particularly to a method for providing a predetermined prioritization in timing sensitive transmission in such communication network systems.

BACKGROUND OF THE INVENTION

Figure 1:
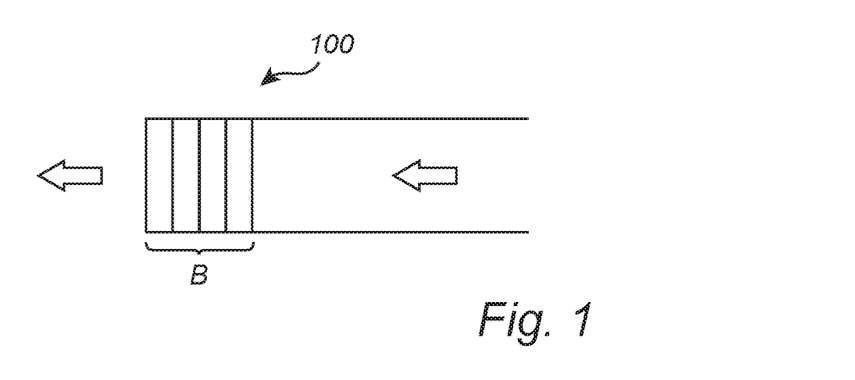
FIG. 1 is a schematic illustration of a dedicated input or output frame buffer.

In the recent years, substantial attention has been directed to real time communication over packet switched communication networks like the Internet. In real time communication, such as audio and video streaming, timeliness and low latency can be more important than reliability of the packet streaming/transport. As communications networks are made up of a plurality of nodes that communicate over communication links that transfer information, the performance of the packet transport is impacted by packet delay variation in the network, and can suffer from buffer delay, head-of-line blocking delay, and priority inversion, which will have effect on timing sensitive signals such as IEEE1588/PTP (standard for a *Precision Clock Synchronization Protocol for Networked Measurement and Control Systems*). In the packet data networks transport, data is delivered over the network in packets. The packets are routed via intermediate nodes of the network, i.e. packets switches or routers, which each subjects the packets to delay due to internal processing, buffering and retransmission at intermediate switches. Intrinsic delay characteristics of a node in a communication network include input stage delay which is the time required for classification and admission control. Another primary source of the delay variations of the packet network is output queuing delay, which is caused as packets arrive at a switch or router when the exit port is blocked by other packets, in which case the incoming packet has to be queued/buffered. The buffering and queuing causes a variable delay and throughput which depends on the network's capacity and the traffic load on the network. In FIG. 1 an incoming packet stream B is illustrated being buffered in a typical buffer 100 before being further retransmitted as indicated by the flow arrows in the figure. Buffer 100 may be a dedicated input or output packet/frame buffer of a network node, e.g. a switch. Packets of a buffer are normally forwarded through the network node using a first-in, first out manner. In order to minimize the impact from the packet network using e.g. PTP packets specific algorithms can be implemented at a client, to allow the packets to be forwarded according to some scheduling discipline for fair queuing, traffic shaping, or for differentiated or guaranteed quality of service, such as weighted fair queuing or leaky bucket.

SUMMARY OF THE INVENTION

In view of the above identified problems, an object of the present invention is to at least provide an improved method for packet based network system and node-to-node transmission of data packets.

This object is achieved by a method according to the present invention as defined in claim 1, which is directed to a mechanism for providing a delay variation compensation in a timing system or timing sensitive signal transport in a packet based network without participating in the timing signaling of the timing packets or timing sensitive packets themselves. The terms "timing packets" and "time sensitive packets" are used interchangeably throughout the text.

Thus, in accordance with an aspect of the present invention, there is provided a method in a packet based network system for node-to-node transmission of data packets comprising timing packets and non-timing packets, the method comprising associating the data packets with different levels of transmission priority, assigning highest (or highest available) transmission priority to the timing packets, separately queuing the timing packets, and providing first opportunity transmission of the timing packets regardless of transmission priority level of non-timing packets waiting to be transmitted, which is advantageous to provide a predetermined propagation delay of the timing packets and/or to minimize the propagation delay of the timing packets being transmitted through the network system. The advantage of the method is that timing-sensitive traffic thereby experiences reduced buffer delay variations which is a result of the first-to-transmit approach.

According to an embodiment of the method, the step of first opportunity transmission further comprises providing a predetermined maximum delay before transmitting each timing packet, which is advantageous because it provides a delay compensation, where non-timing packets being transmitted always appear to block the timing packet by the maximum delay needed until the interface is able to transmit timing packets. Thereby a head of line blocking delay variation impact can advantageously be reduced or fully compensated as the minimum delay for timing packet is increased.

According to an embodiment of the method, it further comprises providing an interrupt sequence adapted for interrupting transmission of a current non-timing packet when there is a timing packet to transmit, thereby limiting a head-of-line block time of the transmission. The interruption of the transmission of non-timing packets is preferably achieved by transmitting an interrupt sequence, terminating the transmission and preparing the receiver for a new packet, such that the receiver can detect and handle the interrupt. This provides a reduced latency due to head-of-line blocking by interrupting the transmitted packet and replacing it with the timing sensitive packet.

According to an embodiment of the method, it further comprises maintaining the interrupted current non-timing packet in a transmit buffer for subsequent transmission at a later time. This reduces loss of interrupted head-of-line packets, such that the impact on that traffic will be a reduced capacity and higher delay rather than dropped packets.

According to an embodiment of the method, it further comprises applying idle pattern to provide an interrupt sequence delay of the interrupt sequence, thereby providing a transmission delay of the system which is independent of whether there is an interruption of the head-of-line packet or not. This advantageously reduces or removes variation due to interrupted head-of-line packets or lack of head-of-line packets on the line, by making sure that the minimum delay of the packet transmission remains the same.

According to an embodiment of the method, it further comprises when applying idle pattern to provide an interrupt sequence delay, transmission of packets having a transmission time which is shorter than said interrupt sequence delay.

The further transmission of short packets as the interrupt sequence delay is provided, reduces the loss of transmission time in the form of idle pattern. This in turn reduces loss of transmission capacity and the delay for transmission of non-timing sensitive traffic. According to an embodiment of the method, it further comprises combining the step of providing a predetermined maximum delay with minimized packet loss. By combining the interruption of transmission of a current non-timing packet as described above, with storing of the packet to be (potentially) interrupted and using an idle sequence equaling the length of the interrupt-sequence and then re-transmitting the interrupted packet provides both timing neutral forwarding for timing-sensitive traffic and low loss for the interrupted non-timing sensitive traffic.

According to an embodiment of the method, it further comprises combining the step of providing a predetermined maximum delay with assigning a high/highest possible priority level for the timing packets, which provides low loss and low stable delay of the packet transmission.

According to an embodiment of the method, a network device transmitter is the originator of the timing packets. Timing nodes, such as a network device transmitter, can advantageously provide timing-neutral outputs with their time-stamping provided deeply in their design, which means that output delay variations for delay sensitive traffic thereby can be stabilized, known and with low loss.

According to an embodiment of the method, in which the network device transmitter is part of a switch or router providing timing cut-through forwarding. (Cut-through forwarding: forwarding with minimal impact on the delay.) Advantageously, non-timing nodes can provide timing-neutral delays for timing sensitive traffic without detailed knowledge of traffic and protocol, beyond identifying timing-sensitive traffic and providing a cut-through forwarding which is timing neutral.

According to a second aspect of the invention, there is provided a network device for a packet based network comprising transmission means for transmitting data packets comprising timing packets and non-timing packets, and processing means arranged for associating data packets with different levels of transmission priority, associating the timing packets with a predetermined highest available transmission priority, queuing timing packets separately on an output interface of the transmission means, and sending timing packets at first opportunity regardless of transmission priorities of non-timing packets waiting to be transmitted. Thereby, a decreased propagation delay of the timing packets is achieved. The processing means are arranged for performing embodiments of the first aspect of the invention.

According to an aspect of the invention, there is provided a node in a communication network comprising means for performing a method according to the invention.

According to a third aspect of the invention, there is provided a software module adapted to perform a method according to the invention, when executed by a computer processor.

Embodiments of the present inventive method are preferably implemented in node to node communication by means of a module for signaling and data transport in form of software, FPGA, ASIC or other suitable arrangement, adapted to perform the method of the present invention (not shown). The software module and/or data-transport module may be integrated in the node comprising suitable processing means and memory means, or may be implemented in an external device comprising suitable processing means and memory means, and which is arranged for interconnection with an existing node.

Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the invention, wherein other parts may be omitted or merely suggested.

DETAILED DESCRIPTION OF PREFERRED EMBODIMENTS

The following detailed description does not limit the invention. Systems and/or methods described herein implement buffer management mechanisms to enable embodiments of a method according to the current invention in a manner that prevents head-of-line blocking of output queues. The terms "packets" and "frames" are used interchangeably throughout the text.

Figure 3:
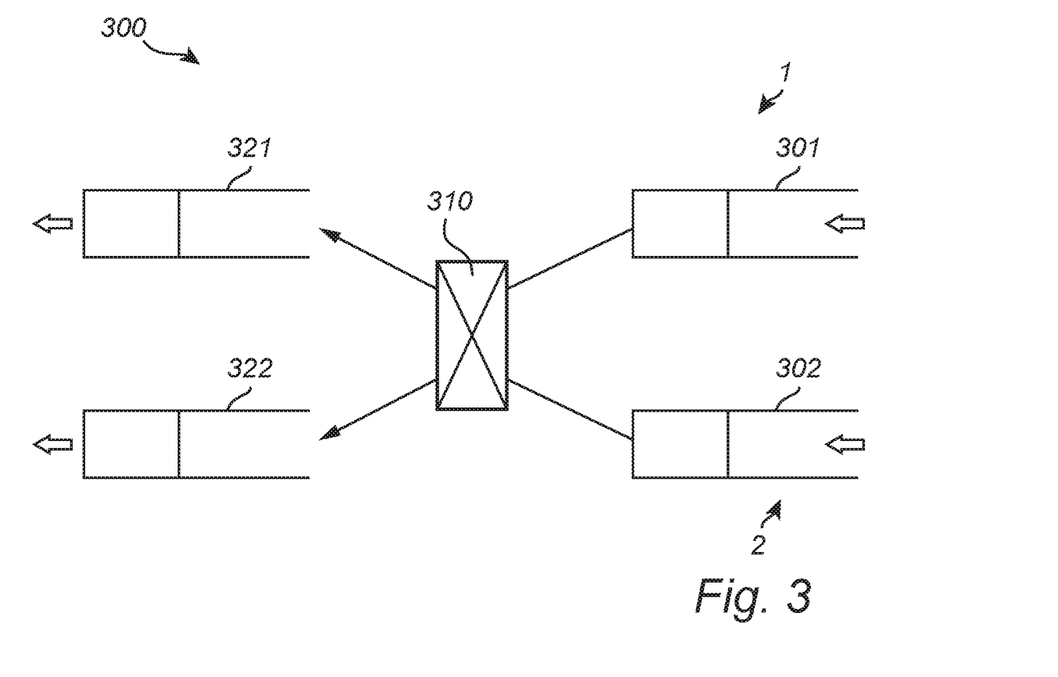
FIG. 3 is a schematic illustration of multiple incoming packet streams being buffered in a multiple output buffer according to an embodiment of the present invention.

A node 300 with two inputs, port 1 and port 2, and two outputs is illustrated in FIG. 3. Traffic received on port 1 is put into an input buffer 301, while traffic received on port 2 is put into an input buffer 302. A switch function 310 investigates the first packet of input buffer 301 and input buffer 302 and decides to which output the packet is to be sent. The packets are then switched to an output buffer 321 of port 1 and output buffer 322 of port 2, respectively. Since traffic can arrive on both port 1 and port 2, and packets queued in input buffer 301 and input buffer 302 can be going to the same output buffer, such as output buffer 321, that traffic is said to aggregate in the switch. The switch function 310 can use any suitable method to mix traffic from the input buffers 301 and 302, including round-robin check of the queues and then performing switching when possible. If the input or output queues of the node 300 are full at the time when a packet is attempted to be put on the queue, that packet is often dropped.

Figure 2:
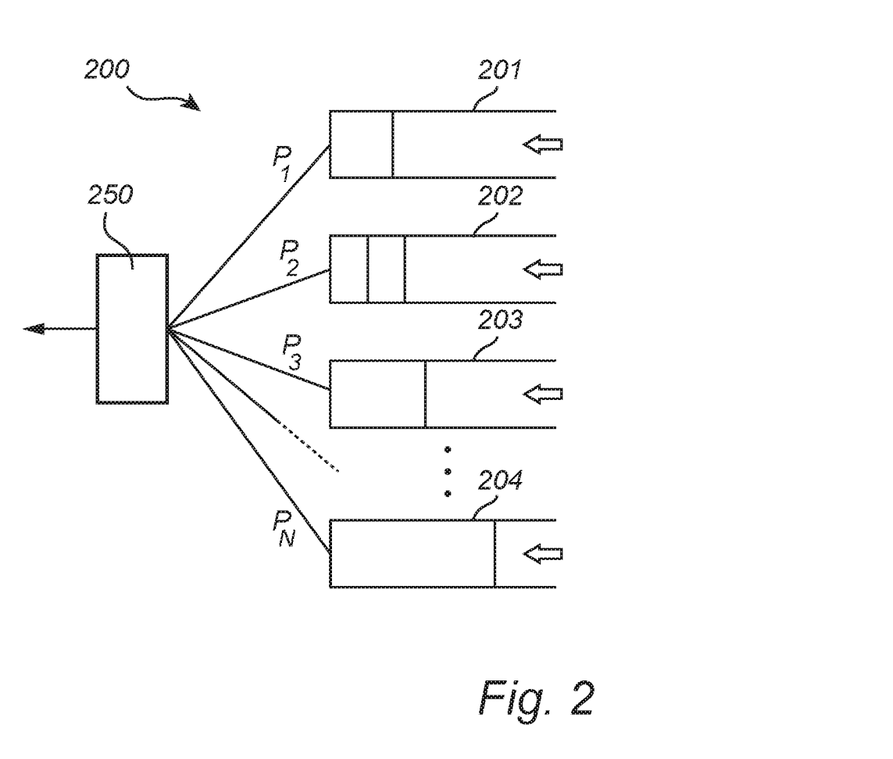
FIG. 2 is a schematic illustration of a buffer with multiple incoming packet streams with different levels of priority.

With reference now to FIG. 2, a node in a packet network may receive a multiple of packet streams which have to be aggregated onto a single output buffer, but in order to handle different needs, and according to an embodiment of the present inventive concept, the traffic is divided into different buffers and scheduled for transmission as is schematically illustrated for a node 200 in FIG. 2. Here a multiple N of incoming packet stream types are received and buffered in a respective input buffer 201, 202, 203, and 204 of node 200, which here is represented by a packet switch 250. The packet switch 250 is provided with a single playout buffer. Each respective data packet arriving at the packet switch 250 is associated with a (preassigned) transmission priority level $P_1, P_2, P_3, \ldots P_N$. The data packets comprise timing sensitive packets and non-timing packets, and the highest transmission priority (available) is assigned to the timing packets, which are then separately queued in a high transmission priority buffer ($P_1$), while non-timing packets are assigned lower level of transmission priority and are queued in lower level transmission priority buffers ($P_2$-$P_N$). At first opportunity, the timing sensitive packets are retransmitted regardless of if non-timing packets are waiting to be transmitted.

Figure 4:
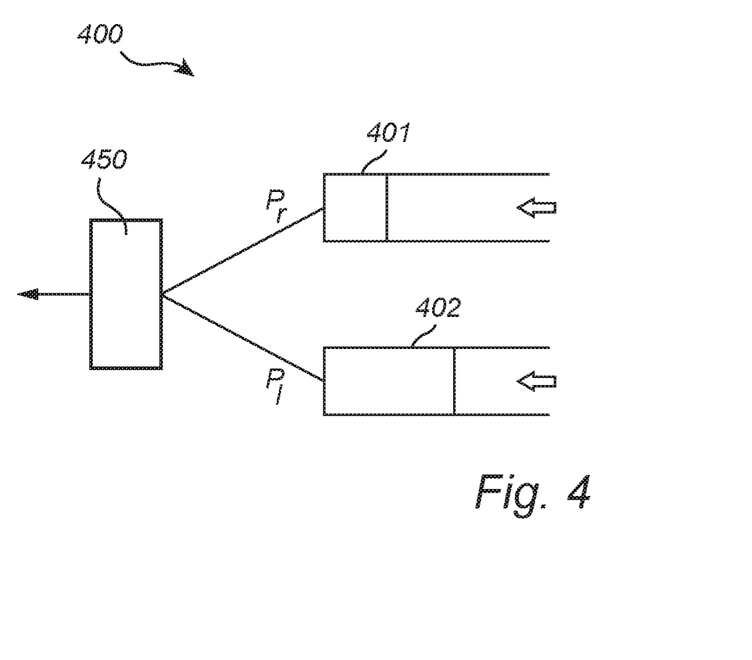
FIG. 4 is a schematic illustration of the separation of a timing sensitive traffic priority queue and a non-timing sensitive traffic priority queue.

For the remainder of this description, packet buffering and priority as discussed above are not discussed in detail, but instead the model for an output buffer mechanism 400 is simplified into FIG. 4 to illustrate the distinction between timing sensitive packets in an input buffer 401 with a high priority Pr, and non-timing sensitive packets in an input buffer 402 with lower priorities Pl. Herein under, the output scheduling mechanism of 450 is further detailed to illustrate the methods of the invention. Consider now the scenario in FIG. 5a where a lower priority packet 460 has been scheduled for transmission because it arrived earlier to the input buffer 402, and a higher priority packet 470 needs to wait in input buffer 401 for the full transmission of packet 460 before transmission can begin. This illustrates head-of-line blocking, an inversion of priority that causes delay variations even for the highest prioritized and most timing sensitive packets. The packet 460 is represented by a packet header 462 and a packet body 461, and packet 470 is represented by a packet header 472 and a packet body 471 in order to illustrate the start of transmission of the two packets. At the time t, the packet header 472 arrives, and packet 460 is already in transmission which is illustrated by packet header 462 being left of the dashed line t aligned to the packet header 472.

Figure 5A:
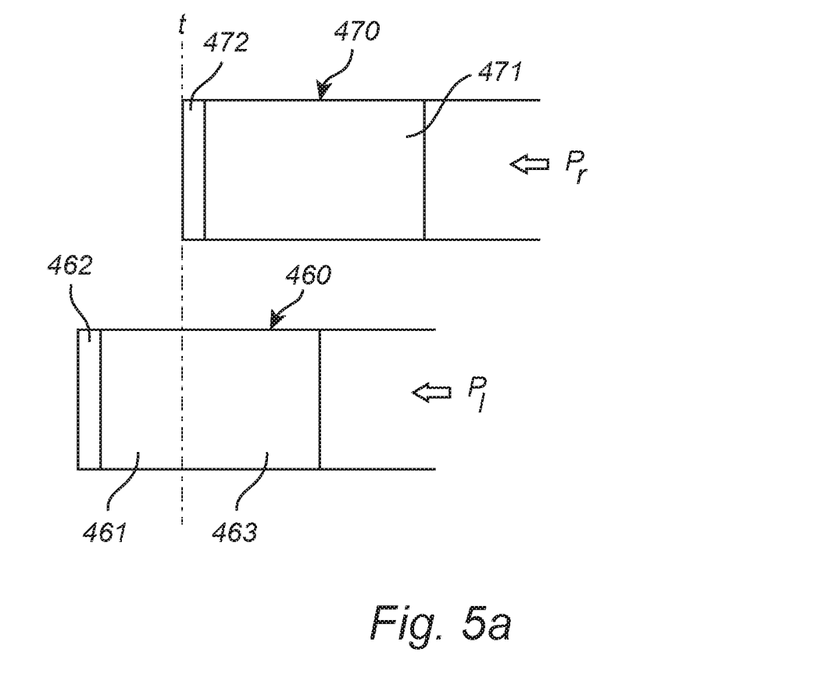
FIG. 5a is a schematic illustration of a timing sensitive packet being head-of-line blocked by a non-timing sensitive packet at transmission.
Figure 5B:
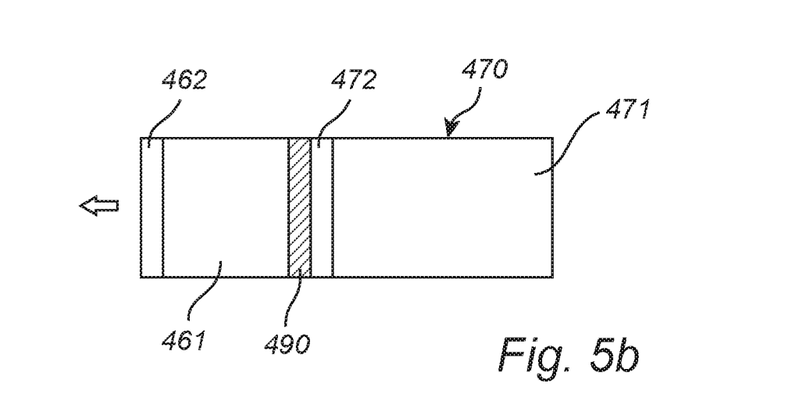
FIG. 5b is a schematic illustration of a timing sensitive packet when having interrupted a non-timing sensitive packet.

According to an embodiment of the invention which is illustrated in FIG. 5b, to address the head-of-line blocking as described with reference to FIG. 5a, the transmission of packet body 461 is ended in advance, and a special escape sequence 490, which will indicate to a receiver end that the packet transmission was interrupted and a new packet will follow, is inserted in the transmission. The escape sequence 490 is then followed by the timing sensitive packet 470 transmission, beginning with packet header 472 followed by its packet body 471. This method will reduce the head-of-line blocking time of the lower priority packet 460, such that the timing sensitive packet experiences a lower delay and also lower delay variation using this cut-through method. The cut-through will discard the lower priority packet 460, so when the escape sequence 490 is as long as or shorter than the remaining transmission of packet 460, the lower priority packet 460 is preferably not interrupted.

According to an embodiment of the invention, the cut-through interruption of packet 460 triggers that a complete copy of packet 460 is maintained in its buffer, and upon interruption of the packet 460, the packet 460/copy is maintained in the output buffer rather than discarded. This will reduce the loss for the lower priority packet stream.

Figure 6A:
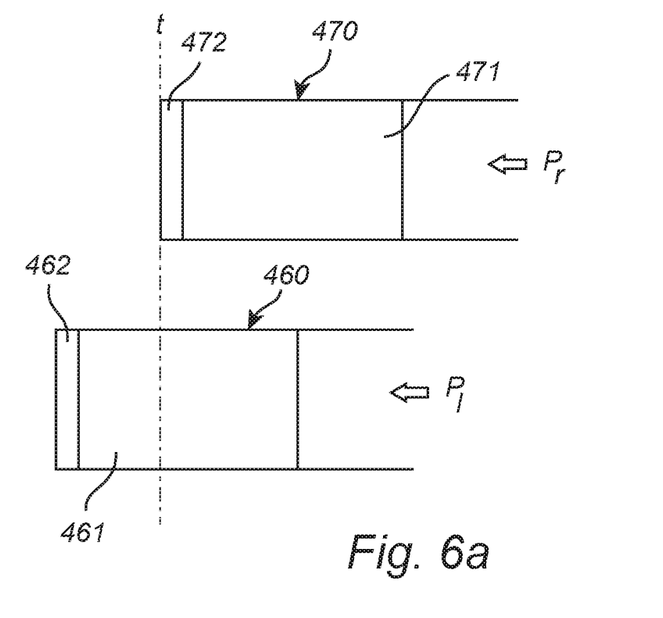
FIG. 6a is a schematic illustration of a timing sensitive packet being head-of-line blocked by a non-timing sensitive packet at transmission.

According to an embodiment of the invention, starting with the same initial condition of FIG. 5a is illustrated again in FIG. 6a, rather than performing a cut-through operation as described with reference to FIG. 5b, the higher priority packet 470 is arranged with an initial delay sequence 500 (typically by means of idle-markers/an idle pattern) which is inserted prior to transmission. By setting a minimum transmission delay, and calculating the length of the delay sequence such that the minimum transmission delay is achieved, then part of or all of the head-of-line blocking delay can be compensated for. If the remaining packet transmission time of the lower priority packet 460 is as long as, or longer than, the minimum transmission delay, then the higher priority packet 470 is transmitted directly after the packet 460. However, if the remaining packet transmission delay of packet 460 is less than the minimum transmission delay, then the delay sequence 500 is transmitted long enough to ensure that packet 470 experiences the minimum packet delay. This way, part of the head-of-line blocking delay will be hidden by the increase of transmission delay. The effect will be that the variation between minimum delay and maximum head-of-line blocking delay will decrease and thus the packet delay variation is reduced. If the minimum transmission delay is set to be that of the maximum head-of-line blocking delay, the full variation due to head-of-line blocking can be compensated for, and the experienced packet delay will become essentially static, as if the network was empty, but at a higher delay.

According to an embodiment of the invention, when providing the interrupt sequence delay simultaneously transmitting short low priority (non-timing) packets, as long as the transmission time of the low priority packets does not exceed the time the the delay sequence 500 needs to fill. If there is any remaining transmission time after inserting short packet(s), the delay sequence is transmitted. Since short packets can be transmitted under otherwise blocked time, the benefit of this method lies in higher utilization of transmission capacity and a lower delay for the low priority packets, and this is without disturbing the delay compensation for the timing sensitive traffic.

Figure 6B:
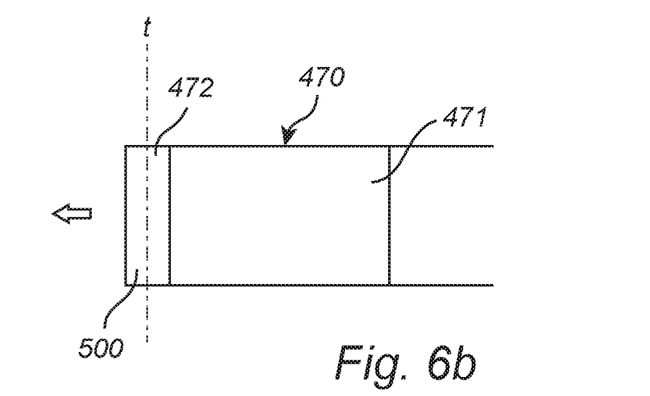
FIG. 6b is a schematic illustration of a timing sensitive packet being delayed by an initial delay to compensate head-of-line blocking delay.

In an embodiment of the invention, the cut-through method described with reference to FIG. 5, and the minimum transmission delay method described with reference to FIG. 6, are combined such that the variations due to cut-through delay and remaining transmission delay is equalized using the minimum transmission delay such that both a low and essentially static delay is achieved.

According to an embodiment of the method, a network device transmitter is the originator of the timing packets.

According to an embodiment of a the invention, the node (e.g. switch or router) comprises a network device transmitter for providing timing cut-through forwarding of data packets. Non-timing nodes can provide timing-neutral delays for timing sensitive traffic without detailed knowledge of traffic and protocol, beyond identifying timing-sensitive traffic and providing a cut-through forwarding which is timing neutral.

The invention claimed is:

1. A method in a packet based network system for node-to-node transmission of data packets including at least one timing-sensitive packet (timing packet) and at least one timing-insensitive packet (non-timing packet), said method comprising:
   associating said data packets with different levels of transmission priority, such that,
      the at least one timing packet is associated with a highest transmission priority based on being a timing packet, and
      the at least one non-timing packet is associated with a lower transmission priority based on being a non-timing packet;
   separately queuing the at least one timing packet and the at least one non-timing packet in separate buffers according to transmission priority, wherein each separate buffer is associated with a separate transmission priority, such that the at least one timing packet is queued in a highest priority buffer associated with the highest transmission priority; and
   transmitting the data packets queued in the separate buffers asynchronously in relation to a network clock and according to transmission priority, such that the at least one timing packet is transmitted at a first opportunity of transmission regardless of transmission priorities of the at least one non-timing packet waiting to be transmitted, wherein the transmitting includes transmitting each separate timing packet of the at least one timing packet upon an elapse of a separate time delay, wherein each separate time delay is provided to be inserted prior to transmission of a separate timing packet in response to the separate timing packet being prepared for transmission to reduce packet delay variation.

2. The method according to claim 1, further comprising:
   in response to the at least one timing packet is queued in the highest priority buffer concurrently with a non-timing packet being transmitted, interrupting the transmission of the non-timing packet to transmit the at least one timing packet.

3. The method according to claim 2, further comprising:
   maintaining the interrupted non-timing packet in a transmit buffer, concurrently with transmitting the at least one timing packet.

4. The method according to claim 2, further comprising:
   applying an idle pattern to the at least one timing packet to implement an interrupt sequence delay of transmission between interrupting the transmission of the non-timing packet and initiating transmission of the at least one timing packet.

5. The method according to claim 4, further comprising:
   completing transmission of the non-timing packet prior to the interrupt sequence delay, based on the non-timing packet having a transmission time which is shorter than said interrupt sequence delay.

6. The method according to claim 1, further comprising:
   receiving the at least one timing packet from a network device transmitter.

7. The method according to claim 6, wherein said network device transmitter is included in a node, the node is one of a switch or a router, and the node is configured to provide timing cut-through forwarding of data packets.

8. A network device for a packet based network, comprising:
   a transmitter configured to transmit data packets, the data packets including at least one timing-sensitive packet (timing packet) and at least one timing-insensitive packet (non-timing packet);
   a memory storing computer readable instructions; and
   a processor configured to execute the computer readable instructions to,
      associate data packets with different levels of transmission priority, such that,
         the at least one timing packet is associated with a highest transmission priority based on being a timing packet, and
         the at least one non-timing packet is associated with a lower transmission priority based on being a non-timing packet;
      queue the at least one timing packet and the at least one non-timing packet separately on an output interface of said transmitter, such that the at least one timing packet is queued ahead of any non-timing packet;
      transmit the data packets queued on the output interface asynchronously in relation to a network clock and according to transmission priority, such that the at least one timing packet is transmitted at a first opportunity of transmission regardless of transmission priorities of the at least one non-timing packet waiting to be transmitted, wherein the transmitting includes transmitting each separate timing packet of the at least one timing packet upon an elapse of a separate time delay associated with timing packet transmissions, wherein each separate time delay is provided to be inserted prior to transmission of a separate timing packet in response to the separate timing packet being prepared for transmission to reduce packet delay variation.

9. The network device according to claim 8, wherein the processor is further configured to execute computer readable instructions to provide an interrupt sequence to interrupt transmission of a current non-timing packet based on a determination that there is at least one timing packet to transmit.

10. The network device according to claim 9, wherein the processor is further configured to execute computer readable instructions to maintain the interrupted non-timing packet in a transmit buffer, concurrently with transmitting the at least one timing packet.

11. The network device according to claim 9, wherein the processor is further configured to execute computer readable instructions to apply an idle pattern to the at least one timing packet to implement an interrupt sequence delay of transmission between interrupting the transmission of the non-timing packet and initiating transmission of the at least one timing packet.

12. A node in a communication network, the node comprising:
   a memory storing computer readable instructions; and
   a processor configured to execute the computer readable instructions to perform the method according to claim 1.

13. A non-transitory computer readable storage medium storing computer readable instructions that are executable by a computer processor to cause the computer processor to perform the method according to claim 1.

14. A method, comprising:
   associating at least one data packet, of a plurality of data packets, with a transmission priority, based on a determination that the at least one data packet is a timing-sensitive packet (timing packet), such that a remainder of the plurality of data packets are free from being associated with the transmission priority; and transmitting the plurality of data packets asynchronously in relation to a network clock and according to associated transmission priority, such that the at least one timing packet is transmitted at a first opportunity of transmission regardless of transmission priorities of at least one non-timing packet waiting to be transmitted, wherein the transmitting includes transmitting each separate timing packet of the at least one timing packet upon an elapse of a separate time delay associated with timing packet transmissions, wherein each separate time delay is provided to be inserted prior to transmission of a separate timing packet in response to the separate timing packet being prepared for transmission to reduce packet delay variation.

15. The method according to claim 14, further comprising:
   interrupting the transmission of a particular data packet to transmit the at least one timing packet, such that the particular data packet is an interrupted packet, based on associating the at least one timing packet with the transmission priority concurrently with the particular data packet being transmitted, and further based on the particular data packet being free from association with the transmission priority.

16. The method according to claim 15, further comprising:
   maintaining the interrupted packet in a transmit buffer, concurrently with transmitting the at least one timing packet.

17. The method according to claim 15, further comprising:
   applying an idle pattern to the at least one timing packet to implement an interrupt sequence delay of transmission between interrupting the transmission of the particular data packet and initiating transmission of the at least one timing packet.

* * * * *